(12) United States Patent
Felderman et al.

(10) Patent No.: US 9,135,254 B2
(45) Date of Patent: *Sep. 15, 2015

(54) SEGMENTING DOCUMENTS WITHIN A FULL TEXT INDEX

(71) Applicant: International Business Machines Corporation, Armonk, NY (US)

(72) Inventors: Gregory S. Felderman, Westminster, CO (US); Brian K. Hoyt, Thornton, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/470,441

(22) Filed: Aug. 27, 2014

(65) Prior Publication Data

US 2014/0372475 A1 Dec. 18, 2014

Related U.S. Application Data

(63) Continuation of application No. 13/751,616, filed on Jan. 28, 2013.

(51) Int. Cl.
*G06F 17/30* (2006.01)

(52) U.S. Cl.
CPC .... *G06F 17/30011* (2013.01); *G06F 17/30477* (2013.01); *G06F 17/30675* (2013.01)

(58) Field of Classification Search
CPC .................. G06F 17/30011; G06F 17/30477; G06F 17/30675
USPC ......................................................... 707/769
See application file for complete search history.

(56) References Cited

U.S. PATENT DOCUMENTS

| 5,442,778 | A | * | 8/1995 | Pedersen et al. ....................... 1/1 |
| 5,832,479 | A |  | 11/1998 | Berkowitz et al. |
| 6,631,373 | B1 | * | 10/2003 | Otani et al. ........................... 1/1 |
| 7,254,580 | B1 | * | 8/2007 | Gharachorloo et al. ............... 1/1 |
| 7,293,016 | B1 | * | 11/2007 | Shakib et al. ......................... 1/1 |

(Continued)

OTHER PUBLICATIONS

Abusukhon et al., "Comparison Between Document-Based, Term-Based and Hybrid Partitioning", In Proceedings of the First International Conference on the Application of Digital Information and Web Technologies (ICADIWT 2008), Aug. 2008, pp. 90-95.

(Continued)

*Primary Examiner* — Phuong Thao Cao
(74) *Attorney, Agent, or Firm* — Farrokh Pourmirzaie; SVL IP Law Edell, Shapiro & Finnan, LLC

(57) ABSTRACT

A system, method and computer program product for searching documents within a collection includes partitioning the collection into a plurality of document segments based on a range of values for a document attribute. Each document segment is associated with a different value range for the document attribute and includes documents each with a value for the document attribute within the associated value range. The system, method and computer program product also determines one or more document segments to search based on one or more search criteria within a search request pertaining to the document attribute. The system, method and computer program product further searches the determined one or more document segments for information satisfying the search request.

7 Claims, 6 Drawing Sheets

(56) References Cited

U.S. PATENT DOCUMENTS

| | | |
|---|---|---|
| 7,617,184 B2 | 11/2009 | Ferrari et al. |
| 7,617,226 B1 | 11/2009 | Burrows et al. |
| 7,620,624 B2 | 11/2009 | Stata et al. |
| 7,681,011 B1 * | 3/2010 | Shmuylovich et al. ....... 711/173 |
| 7,685,109 B1 * | 3/2010 | Ransil et al. ........... 707/999.003 |
| 7,693,824 B1 | 4/2010 | Diament |
| 7,730,087 B2 | 6/2010 | Dexter et al. |
| 7,769,792 B1 | 8/2010 | Burrows et al. |
| 7,849,063 B2 | 12/2010 | Stata et al. |
| 7,853,615 B2 | 12/2010 | Liu et al. |
| 7,870,116 B2 | 1/2011 | Olsen |
| 7,937,386 B2 | 5/2011 | Barrett et al. |
| 7,991,777 B2 * | 8/2011 | Moe ............................... 707/740 |
| 8,301,603 B2 * | 10/2012 | Kan et al. ...................... 707/673 |
| 8,321,456 B2 | 11/2012 | Barbieri et al. |
| 8,688,904 B1 * | 4/2014 | Ari et al. ...................... 711/111 |
| 8,793,287 B2 | 7/2014 | Peh et al. |
| 2002/0046220 A1 | 4/2002 | Freeman et al. |
| 2003/0093647 A1 | 5/2003 | Mogi et al. |
| 2005/0097278 A1 * | 5/2005 | Hsu et al. ...................... 711/129 |
| 2005/0111824 A1 | 5/2005 | Hunter et al. |
| 2005/0120004 A1 * | 6/2005 | Stata et al. ......................... 707/3 |
| 2005/0198076 A1 | 9/2005 | Stata et al. |
| 2006/0053163 A1 | 3/2006 | Liu et al. |
| 2007/0168336 A1 * | 7/2007 | Ransil et al. ...................... 707/3 |
| 2008/0033927 A1 * | 2/2008 | Richards et al. .................. 707/4 |
| 2008/0033934 A1 * | 2/2008 | Richards et al. .................. 707/5 |
| 2008/0033958 A1 * | 2/2008 | Richards et al. .................. 707/9 |
| 2008/0033964 A1 * | 2/2008 | Richards et al. ................ 707/10 |
| 2008/0059404 A1 * | 3/2008 | Jonker et al. ...................... 707/2 |
| 2009/0043740 A1 * | 2/2009 | Olsen ................................ 707/3 |
| 2009/0144279 A1 * | 6/2009 | Moe ................................... 707/6 |
| 2009/0254523 A1 * | 10/2009 | Lang et al. ......................... 707/3 |
| 2010/0106752 A1 | 4/2010 | Eckardt et al. |
| 2010/0145918 A1 | 6/2010 | Stata et al. |
| 2010/0274782 A1 | 10/2010 | Barbierei et al. |
| 2010/0306238 A1 | 12/2010 | Balakrishnan et al. |
| 2010/0318587 A1 * | 12/2010 | Seet et al. ..................... 707/955 |
| 2011/0022596 A1 | 1/2011 | Wei et al. |
| 2011/0196889 A1 | 8/2011 | Pfeifle et al. |
| 2011/0276559 A1 * | 11/2011 | Moe ............................... 707/706 |
| 2011/0283075 A1 * | 11/2011 | Jess et al. ...................... 711/162 |
| 2012/0109977 A1 * | 5/2012 | Balinsky et al. .............. 707/750 |
| 2012/0173534 A1 * | 7/2012 | Keil et al. ..................... 707/740 |
| 2012/0209847 A1 | 8/2012 | Rangan |
| 2013/0238628 A1 * | 9/2013 | Behnen et al. ................. 707/741 |
| 2013/0332484 A1 * | 12/2013 | Gajic ............................ 707/770 |
| 2014/0032563 A1 * | 1/2014 | Lassen et al. ................. 707/741 |
| 2014/0108587 A1 * | 4/2014 | Goldberg et al. ............. 709/215 |
| 2014/0181071 A1 * | 6/2014 | Pidduck et al. ............... 707/711 |
| 2014/0181122 A1 * | 6/2014 | Jain et al. ...................... 707/749 |
| 2014/0214882 A1 | 7/2014 | Felderman et al. |
| 2014/0236918 A1 | 8/2014 | Cohen et al. |
| 2014/0280707 A1 * | 9/2014 | Shukla et al. ................. 709/217 |
| 2014/0289185 A1 | 9/2014 | Lindblad et al. |

OTHER PUBLICATIONS

Puppin et al., "Query-Driven Document Partitioning and Collection Selection", In Proceedings of the First International Conference on Scalable Information Systems (INFOSCALE '06), May 29-Jun. 1, 2006, 8 pages.

* cited by examiner

SEGMENTING DOCUMENTS WITHIN A FULL TEXT INDEX

CROSS-REFERENCE TO RELATED APPLICATIONS

This application is a continuation of U.S. patent application Ser. No. 13/751,616, entitled "SEGMENTING DOCUMENTS WITHIN A FULL TEXT INDEX" and filed Jan. 28, 2013, the disclosure of which is incorporated herein by reference in its entirety.

BACKGROUND

1. Technical Field

Present invention embodiments relate to segmenting a collection of documents, and more specifically, to improving full text index searching of documents stored in one or more databases.

2. Discussion of the Related Art

Document searching to be done in a quick and efficient manner is of prime importance in today's fast-paced environment. With databases storing greater amounts of data than before, the amount of time expended in a document search can be fairly lengthy, which leads to undesired latency in obtaining a desired document from the time when a document search request was entered by a user.

BRIEF SUMMARY

According to one embodiment of the present invention, a computer-implemented method of searching documents within a collection includes partitioning the collection into a plurality of document segments based on a range of values for a document attribute, wherein each document segment is associated with a different value range for the document attribute and includes documents each with a value for the document attribute within the associated value range. The method also includes determining one or more document segments to search based on one or more search criteria within a search request pertaining to the document attribute. The method further includes searching the determined one or more document segments for information satisfying the search request. Embodiments of the present invention further include a program product and apparatus for searching a document collection in substantially the same manner described above.

DETAILED DESCRIPTION

Present invention embodiments operate to perform data segmenting in one or more segments of a data storage, to provide desired data to a user with little latency.

Conventionally, documents stored in a database are searched based on keywords entered by a user. For example, a full text search can be performed on all documents stored in a database, and those documents that "hit" (e.g., documents that include the keywords entered by the user) are provided to the user as the search results.

Full text searching can be very time consuming, especially in cases where the documents stored in the database are large in size (e.g., multiple gigabytes in size or greater). Present invention embodiments speed up full text searching by performing document segmentation based on document attributes, so that only documents that have an attribute or attributes according to a search term entered by a user are searched for keywords included in the search term. In one example, the attribute may correspond to a date that the document was created, or a date that the document was entered into the database in which it is currently being stored. The attribute information of a document can be stored within the document itself (i.e., in a predetermined portion of the document, such as a beginning portion of the document), or separately from the document.

By way of example, a user may enter a keyword search, which requests a search to be made for all phone calls made to a particular city within the last three months. Based on this search request, a segment table is first searched to determine which collections (e.g., segments) of a database contain phone records of the last three months, and based on that information, only those collections (or database segments) are searched using a full text search based on the keywords entered by the user in his/her search request (e.g., all phone records within the last three months that are calls made to New York City and that are made to "1-800" toll-free phone numbers).

Figure 1:
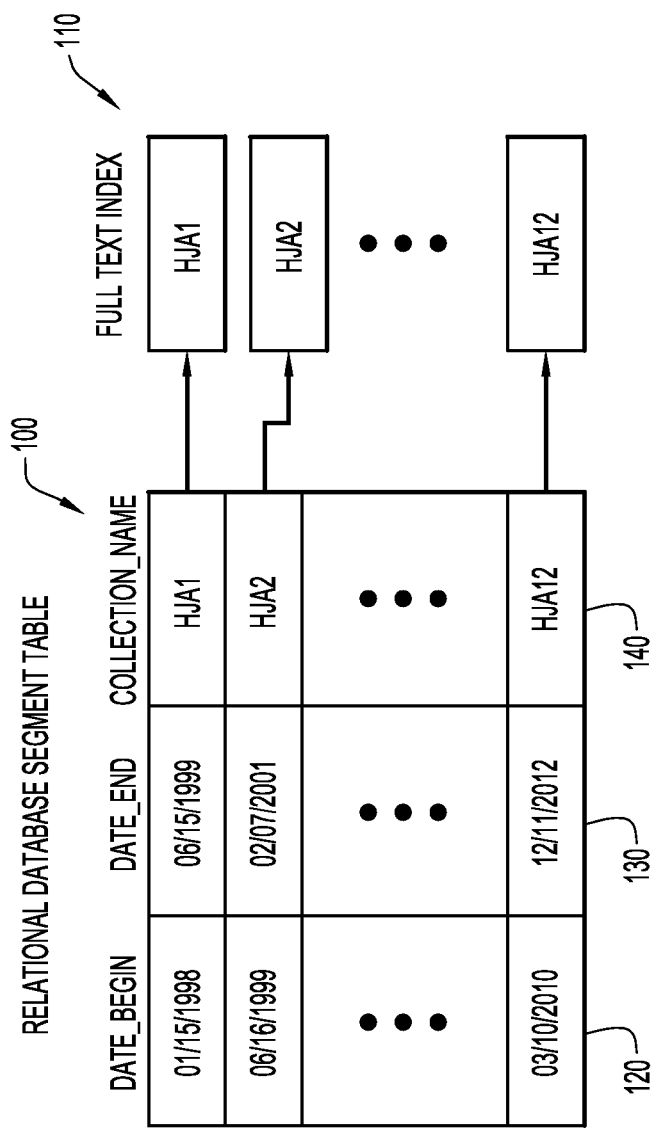
FIG. 1 shows an implementation of a relational database segment table that may be utilized in present invention embodiments.

FIG. 1 is a block diagram showing a structure of a relational database segment table 100. The table 100 may be used in various embodiments described herein, in order to perform searching of segments of a database 110 and not the entire database. The searching is performed in accordance with attributes of the documents stored in those database segments matching information provided by the user in his/her keyword search input.

In more detail, the table 100 includes a plurality of entries, with each entry including a first field 120, a second field 130, and a third field 140. By way of example, in a case where the document attribute that is the basis of storing documents in different segments of a database is the date when the document was created, the first field 120 corresponds to a "Date_Begin" field, the second field 130 corresponds to a "Date_End" field, and the third field 140 corresponds to a "Collection_Name" field. The first entry in the table 100 indicates that database segment HJA1 stores documents that were created from Jan. 15, 1998 to Jun. 15, 1999, the second entry indicates that database segment HJA2 stores documents that were created from Jun. 16, 1999 to Feb. 7, 2001, . . . , and the nth entry indicates that database segment HJA12 stores documents that were created from Mar. 10, 2010 to Dec. 11, 2012.

Based on the information stored in the table 100 and based on search input information provided by a user, only the required collections of the database 110 (shown as having twelve separate collections or segments in FIG. 1) are searched based on keywords entered by the user, to thereby quicken the searching of the entire database by excluding searching of segments of the database 110 that do not meet the requirements set forth in the user's search input information.

For example, if the user entered a search for documents that were created within April, 2010, then only database segment HJA12 would be searched for the particular keyword search phrase entered by the user (as part of the user's search input information). That way, assuming that each of the database segments is approximately of the same size as each other, only 112 of the database 110 is searched to find information pertinent to the user's search input information. Since full text searching can be fairly time consuming even with powerful processors performing such searching, the dine saved by only searching relevant portions of a large database can be very useful, especially in cases where the "wait time" causes a user to want to try a different full text searching application.

Figure 2:
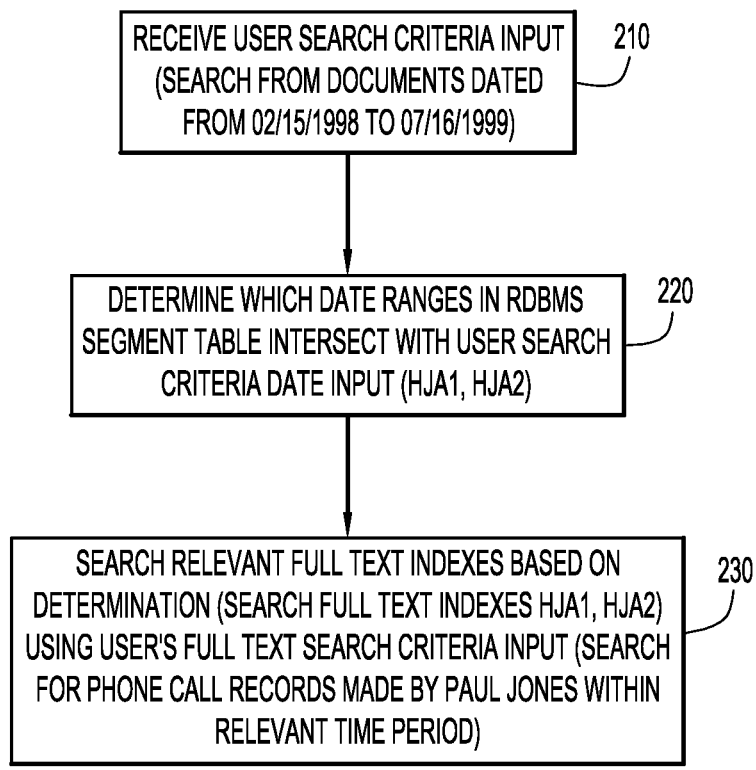
FIG. 2 is a flow diagram of a method of searching documents within a collection according to present invention embodiments.

FIG. 2 is a flow diagram showing the process in which a search of a database is performed based on a user's search criteria. In 210, a user search criteria is received, for example, a search of documents from Feb. 15, 1998 to Jul. 16, 1999. In 220, a determination is made as to which date ranges in the relational database segment table 100 (see FIG. 1) intersects with the user search date range criteria. In the example database segment table 100 shown in FIG. 1, the database segments HJA1 and HJA2 intersect with the user's date range criteria. In 230, a search is performed, such as a full text search, of the documents in database segments HJA1 and HJA2, using the user's full text search criteria, in which the other database segments HJA3, HJA4, ..., HJA12 are not searched.

As discussed above, the size of the different database segments HJA1, HJA2, ..., HJA12 can be of a similar size, to thereby partition the database into somewhat equal-sized segments in which more detailed document searching, such as full text document searching, can be performed for all documents within those database segments. For example, for a database storing 120 Gbytes of data, then each of the twelve database segments HJA, HJA2, HJA12 may be sized so that each one contains approximately 10 Gbytes of data.

Figure 3:
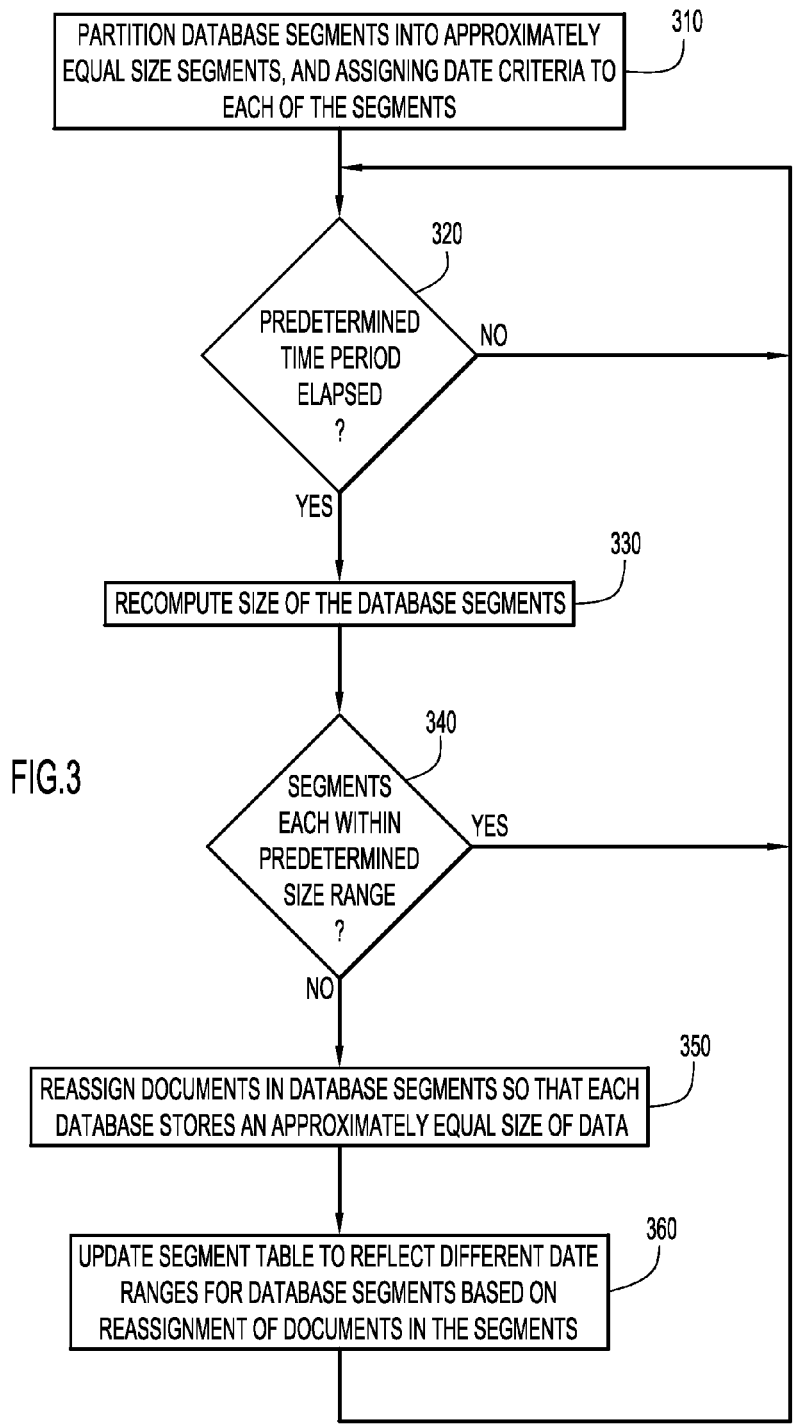
FIG. 3 is a flow diagram of a method of reassigning documents within plural database segments according to present invention embodiments.

FIG. 3 is a flow diagram illustrating a database segmenting method according to one or more embodiments. In 310, a database is segmented into approximately equal sized segments, in which a particular document attribute is used to store a document into a particular one of the segments that matches with the document attribute (e.g., a document having a create date of Jan. 16, 1998 is stored in database segment HJA1 that has a document range of between Jan. 15, 1998 and Aug. 15, 1999). In 320, a determination is made as to whether or not a particular time period has expired since the database was last partitioned. For example, the particular time period may correspond to one day, one week, one month, or one year.

If the determination is No, then the process returns to 320 to wait until the predetermined time period has elapsed. If the determination is Yes, then in 330 the sizes of the database segments are recomputed based on documents that may have been added to the database and/or deleted from the database during the last time period.

In 340, a determination is made as to whether each of the database segments are within a predetermined size range. For example, a determination is made as to whether each of the database segments HJA1, HJA2, ..., HJA12 shown in FIG. 1 are within a size range of 8 Gbytes to 12 Gbytes. If each of the database segments are within the predetermined size range (the determination is Yes), then the process returns to 320 to wait until the predetermined time period has elapsed. If each of the database segments are not within the predetermined size range (the determination is No), then in 350 documents stored in the database are reassigned to document segments such that each of the database segments are within the predetermined size range.

By way of example, if database segments HJA1, HJA2, ..., HJA10 are each within the 8 Gbytes to 12 Gbytes size range, if database segment HJA11 is 7 Gbytes in size, and if database segment HJA12 is 13 Gbytes in size, then some documents within database segment HJA12 are reassigned to database segment HJA11, so that database segment HJA 11 is now 8.5 Gbytes in size and database segment HJA12 is now 11.5 Gbytes in size.

In 360, the segment table 100 is updated to reflect the reassignment of documents made in 350. In the above example, the reassignment of some documents from database segment HJA12 to database segment HJA11 results in the Date_Begin field of database segment HJA12 changing from Mar. 10, 2010 to Jul. 10, 2010, and with the Date_End field of database segment HJA11 changing from its prior date (not shown in FIG. 1) to Jul. 9, 2010. The process returns to 320 to wait until the predetermined time period has elapsed.

Figure 4:
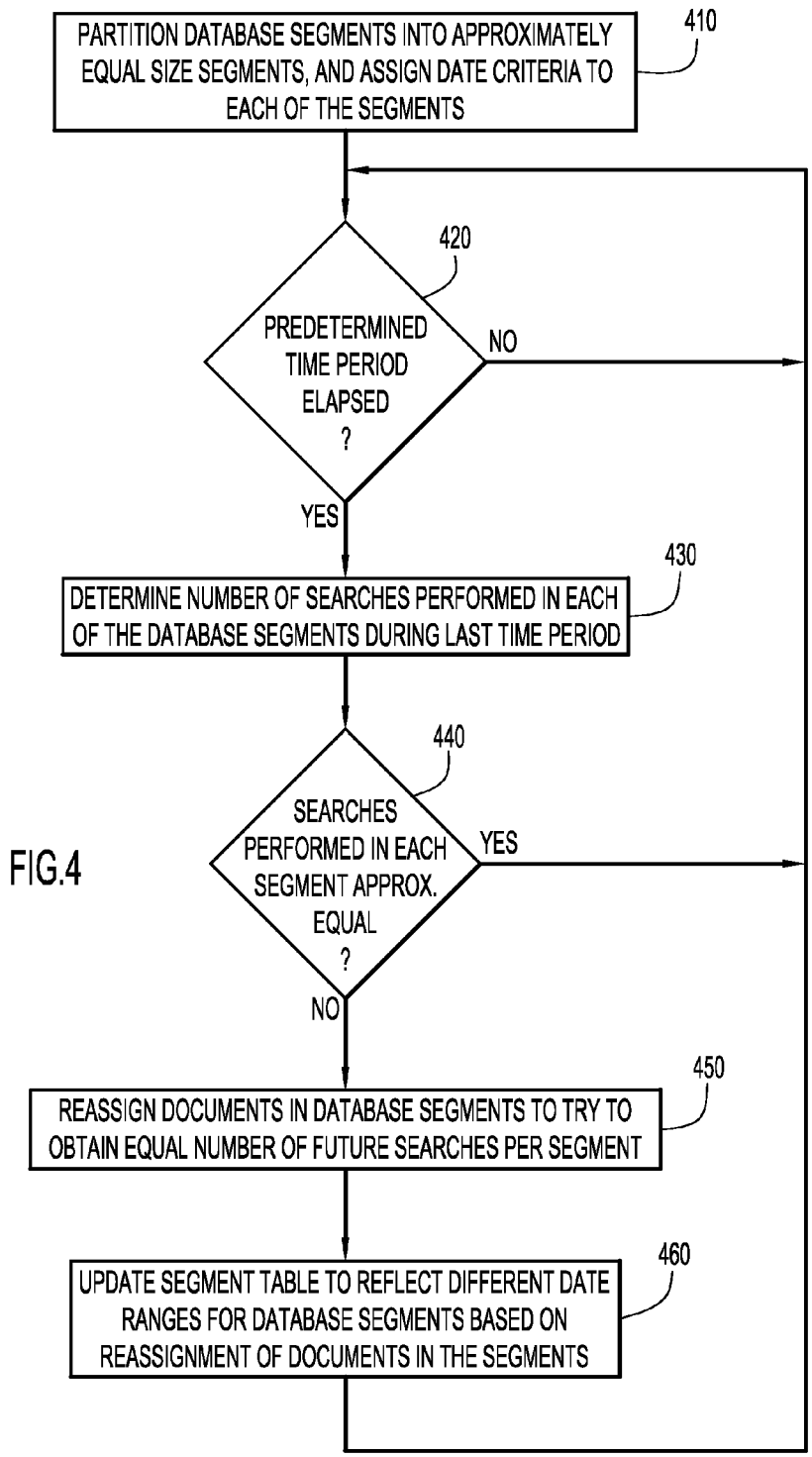
FIG. 4 is a flow diagram of a different method of reassigning documents within plural database segments according to present invention embodiments.

FIG. 4 is a flow diagram illustrating another database segmenting method according to one or more embodiments. In 410, a database is segmented into approximately equal sized segments, in which a particular document attribute is used to store a document into a particular one of the segments that matches with the document attribute (e.g., a document having a create date of Jan. 16, 1998 is stored in database segment HJA1 that has a document range of between Jan. 15, 1998 and Aug. 15, 1999). In 420, a determination is made as to whether or not a particular time period has expired since the database was last partitioned. For example, the particular time period may correspond to one day, one week, one month, or one year.

If the determination is No, then the process returns to 420 to wait until the predetermined time period has elapsed. If the determination is Yes, then in 430 the number of searches that have been made to each of the database segments within the last time period is determined.

In 440, a determination is made as to whether the number of searches that have been made to each of the database segments are within a predetermined range of each other. For example, a determination is made as to whether each of the database segments HJA1, HJA2, ..., HJA12 shown in FIG. 1 have a number of searches made to those segments with a range of from 50 to 150 searches. If each of the database segments are within the predetermined search number range (the determination is Yes), then the process returns to 420 to wait until the predetermined time period has elapsed. If each of the database segments are not within the predetermined search number range (the determination is No), then in 450 documents stored in the database are reassigned to document segments such that the contents of each of the database segments are adjusted so as to have an approximately equal number of searches made (based on the historical 'number of searches' information used to make that determination).

By way of example, if database segments HJA1, HJA2, ..., HJA10 each were searched between 50 and 150 times during the last week, if database segment HJA11 was searched 170 times during the last week, and if database segment HJA12 was searched 30 times during the last week, then some documents within database segment HJA11 are reassigned to database segment HJA12, in an attempt to equalize the number of searches made to the different database segments in future time periods. Information as to the number of searches per document can be used to determine how many documents to reassign from one document segment to another document segment.

In 460, the segment table 100 is updated to reflect the reassignment of documents made in 450, and the process returns to 420 to wait until the predetermined time period has elapsed. In the above example, the reassignment of some documents from database segment HJA11 to database segment HJA12 results in the Date_Begin field of database segment HJA12 changing from Mar. 10, 2010 to Jan. 5, 2010, and with the Date_End field of database segment HJA11 changing from its prior date (not shown in FIG. 1) to Jan. 4, 2010. Note that the date ranges for the different database segments do not overlap in this example, in order to lessen the likelihood of having to search different database segments based on a date range search value entered by a user.

Figure 5:
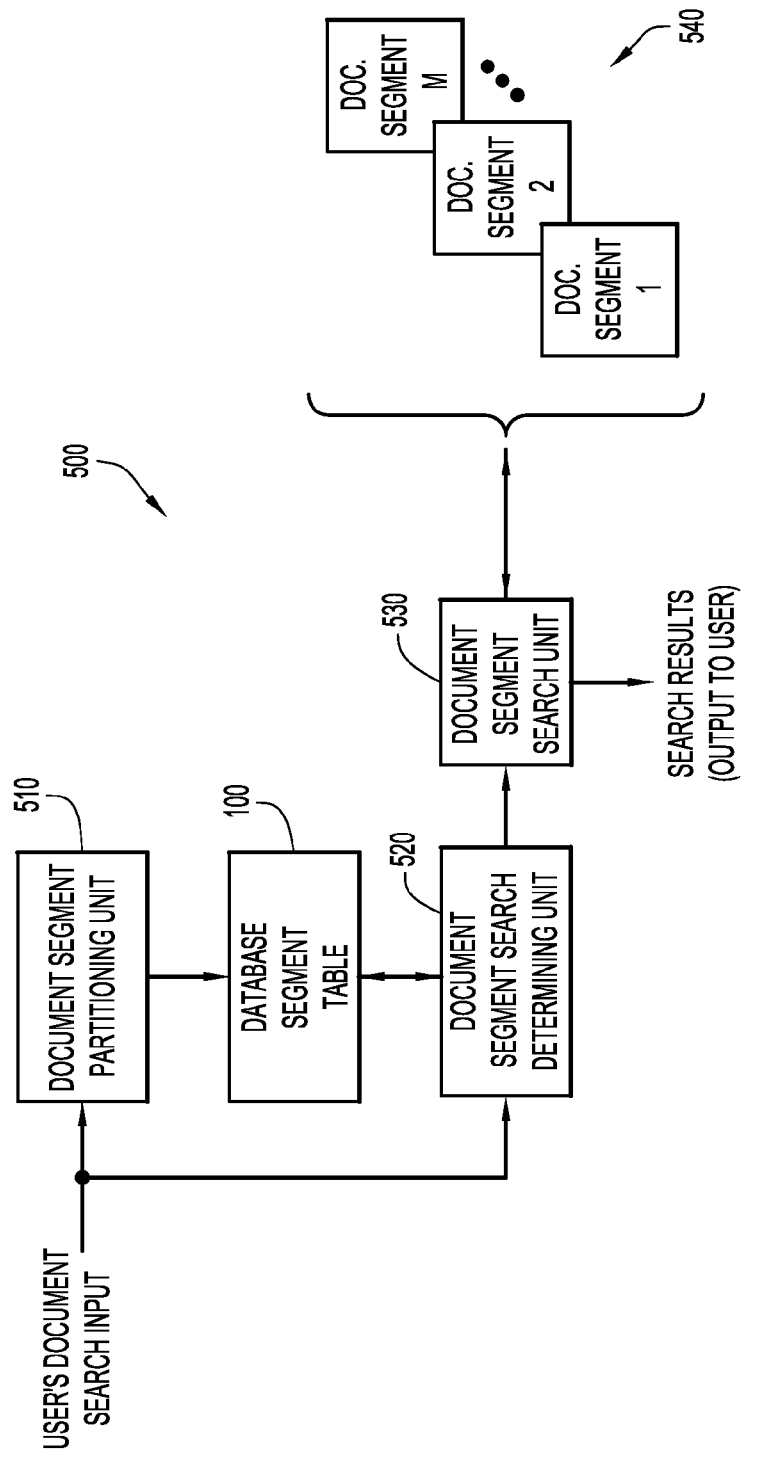
FIG. 5 is a block diagram of an apparatus for searching documents within a collection according to present invention embodiments.

FIG. 5 is a block diagram of an apparatus 500 for performing database segmentation and database searching according to one or more embodiments described herein. A document segment partitioning unit 510 receives a user's search information for searching documents within a database The document segment partitioning unit 510 provides information to be stored in a database segment table 100 (see also FIG. 1), for use in determining which segments of the database are to be searched when a user document search request is received. This may be based on maintaining the size of the different database segments to be approximately equal in size, or based on the number of searches that 'hit' each of the database segments, or both. A document segment search determining unit 520 also receives the user's search information for searching documents within the database, and determines which document segments are to be searched based on information obtained from the database segment table 100 (as updated by the document segment partitioning unit 510). A document segment search unit 530 searches a database 540 that includes plural segments 1, 2, ..., M, based on keywords and/or other search criteria obtained from the user's search request, and outputs document search results to the user.

Figure 6:
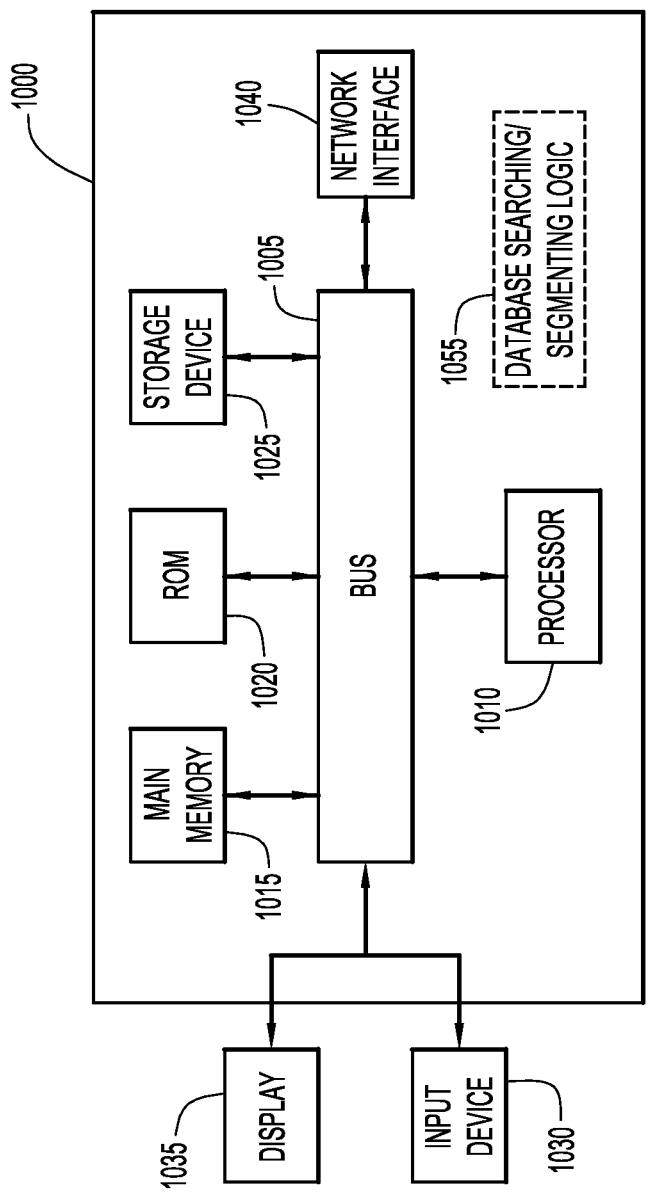
FIG. 6 illustrates a depiction of a computing system that can perform data segmenting and data searching within a collection of documents according to present invention embodiments.

FIG. 6 illustrates a depiction of a computing system 1000 that can perform database segmentation for improving database searching according to the embodiments described above. The computing system 1000 includes a bus 1005 or other communication mechanism for communicating information and a processor 1010 coupled to the bus 1005 for processing information. The computing system 1000 also includes main memory 1015, such as a random access memory (RAM) or other dynamic storage device, coupled to the bus 1005 for storing information, and instructions to be executed by the processor 1010. Turning now to FIG. 5, the document segment partitioning unit 510, the document segment search determining unit 530 and the document segment search unit 540 may be implemented by way of the processor 1010, and the database segment table 520 may be stored in the main memory 1015 or in the storage device 1025, for example. The computing system 1000 may further include a read only memory (ROM) 1.020 or other Static storage device coupled to the bus 1005 for storing static information and instructions for the processor 1010. A storage device 1025, such as a solid state device, magnetic disk or optical disk, is coupled to the bus 1005 for persistently storing information and instructions. Network interface 1040 provides a connection to a network, such as the Internet or a Local Area Network (LAN) or a Wide Area Network (WAN). Database searching/segmenting logic 1055, which may be stored in main memory 1015, ROM 1020 and/or storage device 1025, and which also may include some hardware logic components as well as the modules shown in FIG. 5, is utilized by processor 1010 to perform the database segmenting and searching as described above with respect to various embodiments.

The computing system 1000 may be coupled via the bus 1005 to a display 1035, such as a liquid crystal display, or active matrix display, for displaying information to a user. An input device 1030, such as a keyboard including alphanumeric and other keys, may be coupled to the bus 1005 for communicating information, and command selections to the processor 1010. In another implementation, the input device 1030 has a touch screen display 1035. The input device 1030 can include a cursor control, such as a mouse, a trackball, or cursor direction keys, for communicating direction information and command selections to the processor 1010 and for controlling cursor movement on the display 1035.

It will be appreciated that the embodiments described above and illustrated in the drawings represent only a few of the many ways of implementing embodiments for database segmenting and searching. For example, attributes other than date when a document was created and/or stored into the database may be used as the criteria for determining which database segment to store a document. For example, documents may be stored based on document type, such as "purchase order", "invoice", "receipt", in which each different type of document is stored in a different database segment The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, database segmenting software, database searching software, etc.). These systems may include any types of monitors and input devices (e.g., keyboard, mouse, voice recognition, etc.) to enter and/or view information.

It is to be understood that the software of the present invention embodiments (e.g., the modules shown in FIG. 5) may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments may be available on a recordable or computer useable medium (e.g., magnetic or optical mediums, magneto-optic mediums, floppy diskettes, CD-ROM, DVD, memory devices, etc) for use on stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., database segmentation table, database segments, etc.). The database system may be implemented by any number of any conventional or other databases, data stores or storage structures (e.g., files, databases, data structures, data or other repositories, etc) to store information (e.g., database segmentation table, database segments, etc). The database system may be included within or coupled to the server and/or client systems. The database systems and/or storage structures may be remote from or local to the computer or other processing systems, and may store any desired data (e.g., database segmentation table, database segments, etc.). Further, the various tables (e.g., database segmentation table etc.) may be implemented by any conventional or other data structures (e.g., files, arrays, lists, stacks, queues, etc.) to store information, and may be stored in any desired storage unit (e.g., database, data or other repositories, etc.).

The present invention embodiments are not limited to the specific tasks or algorithms described above, but may be utilized for improving the performance of database segmentation and database searching for any types of documents with any types of data (e.g., multi-media or other files, programs, spreadsheets, etc.). For example, the number of documents to be assigned to each database segment can be made based additionally on the performance characteristics of a full text search engine used to search documents within each database segment. That is, if a first database segment is searching using a more powerful search engine than a second database segment, then that information may be used together with the database size and the database search number information described previously in order to resize the database segments, in which the first database segment would be assigned a larger database chunk than the second database segment based on the searching being performed quicker on the first database segment as compared to the second database segment.

By way of example, a weighting function that is based on both database search engine capability and database segment size and/or number of database search hits within a current predetermined time period may be used to resize the database segments for future database searches to be conducted during the next predetermined time period (e.g., database segment size=X1+X2, where X1 is the proportional segment size or the proportional number of search hits for the respective database segment as compared to the mean segment size value or the mean number of search hits as obtained from all database segments, and where X2 is the proportional database segment search engine capability for the respective database segment as compared to the mean value as obtained from all database segment search engine capabilities).

As another possible implementation, the quantity of documents in each database segment can be adjusted to improve search performance within those database segments. For example, if a first database segment has 500 separate documents each with its own attribute or attributes, and a second database segment has only 100 separate documents (but where average size of the documents in the second database segment is greater than the average size of documents in the first database segment, such that these two segments take up approximately the same memory space) each with its own attribute or attributes, then a processor (see processor 1010 in FIG. 6, for example) may move some (e.g., 200) of the documents in the first database segment to the second database segment to speed up a full text search time in the first database segment (as compared to a full text search time in the second database segment).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples to non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a tangible (non-transitory) computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (Java and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method of searching documents within a collection comprising:
   partitioning, via a hardware processor, the collection into a plurality of document segments based on a range of values for a document attribute, wherein each document segment is associated with a different value range for the document attribute and includes documents each with a value for the document attribute within the associated value range;
   adjusting, via a hardware processor, a quantity of documents within one or more document segments to attain a predetermined range fir a segment characteristic for each of the document segments, wherein the segment characteristic includes a quantity of searches performed for each document segment;
   determining, via a hardware processor, one or more document segments to search based on one or more search criteria within a search request pertaining to the document attribute; and
   searching, via a hardware processor, the determined one or more document segments for information satisfying the search request.

2. The computer-implemented method of claim 1, wherein the document attribute includes one of: a date of loading a document into the collection, and a date of the document.

3. The computer-implemented method of claim 1, wherein partitioning the collection further includes:
   storing associations of document segments and value ranges for the document attribute within a database object.

4. The computer-implemented method of claim 3, wherein determining one or more document segments to search further includes:
   accessing the database object for the value ranges of the document attribute encompassing the one or more search criteria to determine associated document segments for searching.

5. The computer-implemented method of claim 1, further including:
 adjusting a quantity of documents within one or more document segments to control search performance.

6. The computer-implemented method of claim 1, wherein the search includes a full text search of documents within the collection.

7. The computer-implemented method of claim 1, wherein the collection comprises electronic documents stored in a database.

* * * * *